United States Patent Office 3,756,906
Patented Sept. 4, 1973

3,756,906
RUBBER-POLYESTER COMPOSITIONS
Boris Nicholas Leyland and Neil Frederick Wood, Blackley, England, assignors to Imperial Chemical Industries Limited, London, England
No Drawing. Filed Jan. 18, 1971, Ser. No. 107,410
Claims priority, application Great Britain, Feb. 13, 1970, 7,103/70
Int. Cl. B32b 25/02; C09j 5/02
U.S. Cl. 161—231  4 Claims

ABSTRACT OF THE DISCLOSURE

Phosphite esters are incorporated into polyester-reinforced rubbers to decrease thermal degradation of the polyester.

---

This invention relates to compositions in which rubber is reinforced by polyester materials and more particularly to such compositions which contain phosphite esters to stabilise the polyester.

Polymeric materials, especially in the form of fibres, are frequently used in rubber compositions as reinforcing agents. Polyesters have some advantages over other polymeric materials, for example in greater strength and durability over rayon and in higher dimensional stability and reduced setting at low temperatures over polyamides, but suffer from the defect of tending to undergo degradation in contact with hot rubber compounds. It has now been found that this degradation may be hindered by certain phosphite esters.

According to the invention there are provided compositions comprising rubber in contact with polyester material which contain one or more phosphite esters of the formula:

wherein R is an alkyl, alkenyl, cycloalkyl or aryl group or substituted derivative thereof, R' and R" are each a hydrogen atom or a group of the kind represented by R, or R and R' together with the two attached oxygen atoms and the phosphorus atom form a ring or R, R' and R" together with the three attached oxygen atoms and the phosphorus atom form two fused rings, with the proviso that not more than one of the groups R, R' and R" is an unsubstituted phenyl group.

It is preferred that one of the groups R' and R" is a hydrogen atom.

It is preferred that R, and R' and R" when not a hydrogen atom, are alkyl groups containing from 2 to 12 carbon atoms. These groups may contain more than 12 carbon atoms, for example up to 24 carbon atoms, but the stabilising effect tends to diminish, especially when neither R' and R" is a hydrogen atom.

As examples of alkyl and substituted alkyl groups which may be represented by R, R' or R" there are mentioned methyl, ethyl, n-propyl, isopropyl, n-butyl, sec-butyl, tert.-butyl, amyl, hexyl, octyl, isooctyl, nonyl, lauryl and stearyl, and chloroethyl, chloropropyl, bromoethyl, bromopropyl, hydroxyethyl, hydroxypropyl, cyanoethyl, 2,3-epoxypropyl, carboethoxyethyl, phenoxyethyl, benzyl and phenylethyl.

As examples of alkenyl and substituted alkenyl groups which may be represented by R, R' or R" there are mentioned allyl, propenyl, isopropenyl, but-2-enyl, 3-chlorobut-2-enyl, oleyl and erucyl.

As examples of cycloalkyl and substituted cycloalkyl groups which may be represented by R, R' and R" there are mentioned cyclopentyl, cyclohexyl, methylcyclohexyl, tert.-butyl-cyclohexyl, noncylcyclohexyl, 3,3,5-trimethylcyclohexyl, menthyl, decalyl, chlorocyclohexyl and bromocyclohexyl.

As aryl and substituted aryl groups which may be represented by R, R' and R" there are mentioned phenyl, α-naphthyl, 2,4-, 2,5-, 3,5- and 2,6-dimethylphenyl, β-naphthyl, o-, m- and p-cresyl, nonylphenyl, octylphenyl, p-tert. butylphenyl ,o-tert.-butylphenyl, p-methoxyphenyl, chlorophenyl, bromophenyl and nitrophenyl.

As rings which may be formed by two or three of the groups R, R' and R" together with two or three attached oxygen atoms and the phosphorus atom there may be mentioned for example those wherein R, and R' together form an ethylene group or a substituted ethylene group as in monocyclic phosphites from ethylene glycol, 1,2-propanediol or butane-2,3-diol, or a trimethylene or substituted trimethylene group as in the monocyclic phosphites from 1,3-propanediol, neopentyl glycol, trimethylolpropane (one of the hydroxyl groups not being esterified by the phosphite group) or the monocyclic or dicyclic phosphites from e.g. pentaerythritol in which two or four of the hydroxyl groups respectively are esterified, or the dicyclic phosphites from trimethylolpropane (all three of the hydroxyl groups being esterified), or cyclic phosphites in which part of the ring is an aromatic system as in the cyclic phosphites from catechol.

The substituted alkyl, alkenyl, cycloalkyl or aryl groups represented by, for example, R may also be groups linking two or more phosphite ester residues together, the two groups R from two phosphite esters together forming for example a divalent group such as ethylene, trimethylene, 3-oxapentamethylene, 3-thiopentamethylene, 3,5-dioxaoctamethylene, 3-aza-3-methylpentamethylene, 1,5-dimethyl-3-oxapentamethylene, hexamethylene, or divalent groups resulting from diesterification of neopentyl glycol, cyclohexanediol, cyclohexanedimethanol, 4,4'-dihydroxydiphenyl-propane, -ethane- or -methane and nuclear substituted and hydrogenated derivatives thereof, resorcinol, hydroquinone, p-xylyleneglycol, m-xyleneglycol, bis(4-hydroxyphenyl)sulphone, bis(4-hydroxyphenyl) sulphide and bis(4-hydroxyphenyl)sulphoxide. The groups R from more than two phosphite esters may together form linking groups which are of higher valency than 2, or for example the groups R and separately the groups R' may form linking groups thus leading to polymeric phosphites.

The rubber may be any natural or synthetic rubber particularly a sulphur-curable rubber. The rubber may be vulcanised or unvulcanised, but the process of the invention is of particular value with vulcanised rubbers. The presence of the ester is of especial benefit with natural rubber since the degradation of the polyester is normally more rapid in natural rubber than in synthetic rubbers.

As polyester there is meant a polymer of the type obtainable by condensation of one or more polyfunctional carboxylic acids with one or more polyfunctional alcohols, optionally with the inclusion of minor amounts of other compounds containing two or more active hydrogen atoms such as aminoalcohols, and especially fibre- or film-forming polymers derived from bifunctional reactants such as terephthalic acid and ethylene glycol. The polyester will normally be in fibre or fabric form but may be in film or other form used to reinforce rubber.

The phosphite este may be incorporated into the compositions of the invention by any conventional means. The polyester may for example be impregnated with phosphite ester before bringing into contact with the rubber, but it is preferred to add it to the unvulcanised rubber on conventional rubber compounding plant at the same time as any other rubber adjuvants, and then bringing the rubber and polyester together and shape and vulcanise the compositions as desired. It is not necessary that the phosphite ester be present throughout the rubber composition but only that it be present in adequate amount in the region of any rubber/polyester interface, which may be achieved for example by bonding rubber not containing such phosphite ester to polyester by means of a rubber mix containing the phosphite ester.

The phosphite ester is conveniently used in amount between 0.1 and 10% and preferably between 0.5% and 3% of the weight of rubber containing the phosphite ester.

The rubber may contain any of the conventional adjuvants used in rubber technology, for example antioxidants, antiozonants, curing agents, accelerators, retarders, blowing agents, peptising agents, fillers and pigments. The presence of the phosphite ester is of especial benefit when the accelerator used is a sulphenamide thiuram sulphide or dithiocarbamate, since the degradation of the polyester is normally especially severe with the use of these accelerators.

The compositions of the invention are of especial value in the manufacture of tyres, particularly tyres which are intended to be run at sustained high speeds when high temperatures may be generated. They are also, however, of value in other rubber/polyester compositions which may be exposed in manufacture or service to elevated temperatures such as conveyor belting.

The invention is illustrated but not limited by the following examples in which all parts and percentages are by weight unless otherwise specified.

EXAMPLE 1

Rubber mixes of the following compositions are compounded on a two-roll mill:

Smoke dsheet natural rubber _____ 100
Zinc oxide _____ 3.5
Stearic acid _____ 1.5
General purpose furnace black _____ 35
Processing oil _____ 3.0
Sulphur _____ 2.5
N-cyclohexylbenzthiazylsulphenamide _____ 1.0
Phosphite ester, as indicated.

Lengths of polyethylene terephthalate cord are embedded wholly in samples of the rubber mix and the samples heated in a mould under pressure at 170° C. for 2 hours both to cure the rubber and age the composition at an elevated temperature. The cured samples are then swelled in trichloroethylene for 18 hours, the rubber stripped from the cords, and the breaking strengths of the cords determined. For comparison similar cords are embedded and heated in similar rubber mixes but containing no phosphite ester. All the cords before embedding in the rubber had been treated with a bonding agent and heat set.

| Phosphite ester (3% by weight of rubber) | Breaking strength of cord, (kg.) | |
|---|---|---|
| | Untreated cord | Treated cord |
| Diethyl | 6.3 | 13.0 |
| Diisopropyl | 6.3 | 10.0 |
| Diisobutyl | 6.3 | 9.4 |
| Disec.-butyl | 6.3 | 9.3 |
| Di-n-hexyl | 6.3 | 11.5 |
| Bis-(3,3,5-trimethylcyclohexyl) | 7.3 | 10.9 |
| Bis-nonylphenyl | 2.7 | 6.0 |
| Dilauryl | 2.7 | 6.7 |
| Triethyl | 8.3 | 11.0 |
| Polymeric phosphite from 4,4'-isopropylidene-dicyclohexanol and triphenyl phosphite | 8.3 | 9.5 |
| Bis(nonylphenyl)phenyl | 3.8 | 6.0 |
| Diisodecyl pentaerythrityl | 2.7 | 7.5 |
| Trioctyl | 2.7 | 9.5 |

EXAMPLE 2

The procedure of Example 1 is repeated using the phosphates listed below. The results obtained are as follows:

| | Cord strength (kg.) | | |
|---|---|---|---|
| | Aged without additive | Aged with additive | Unaged |
| Tributyl phosphite | 8.3 | 9.1 | 16.0 |
| Trinonyl phosphite | 7.3 | 8.3 | 15.5 |
| Dodecyl phenyl phosphite | 7.3 | 8.5 | 15.5 |
| Tris (4-tert.butylcyclohexyl) phosphite | 1.8 | 8.5 | 16.0 |
| Tricyclohexyl phosphite | 8.9 | 11.6 | 15.5 |
| Tris(methylcyclohexyl)phosphite | 8.9 | 11.0 | 15.5 |
| Dilauryl nonylphenyl phosphite | 1.8 | 7.1 | 16.0 |
| Tetrakis (4-nonylcyclohexyl) bisphenol A diphosphite | 1.8 | 8.9 | 16.0 |
| Tetrakis (lauryl nonylphenyl)pentaerythritol tetraphosphite | 1.8 | 10.2 | 16.0 |
| Bis(lauryl nonylphenyl)-3,6-dioxa-octylene-1,8-diphosphite | 1.8 | 9.4 | 16.0 |
| 2-butoxy-1,3,2-dioxaphospholane | 7.6 | 12.5 | 15.5 |
| Mono-octyl phosphite | 3.1 | 9.9 | 16.0 |
| Mono-[2,2-di(hydroxymethyl)-3,5,5-trimethylhexyl] phosphite | 3.1 | 7.8 | 16.0 |
| Dibenzyl phosphite | 7.3 | 12.8 | 15.5 |
| Neopentyl glycol hedrogen phosphite | 7.1 | 14.2 | 15.5 |
| n-Octyl phenyl hydrogen phosphite | 8.9 | 12.1 | 15.5 |

What we claim is:

1. In rubber articles reinforced with fibrous polyester material, the improvement which comprises the combination of rubber and a polyester fiber containing impregnated therein a phosphite ester in an amount to stabilize the polyester against degradation in such article.

2. A process for the production of a polyester fiber reinforced rubber article comprising interfacially bonding a rubber composition to polyester fiber containing impregnated therein a phosphite ester in an amount to stabilize the polyester against degradation therein.

3. The process of claim 2 wherein said rubber is sulfur curable.

4. The process of claim 2 wherein the rubber has been vulcanized using as accelerator sulphenamide, thiuram, sulphide or dithro carbonate.

References Cited

UNITED STATES PATENTS 3,503,845  3/1970  Hollatz et al. _____ 161—184
3,172,871  3/1965  Malz et al. _____ 260—45.9
3,433,759  3/1969  Bayerl et al. _____ 260—33.6
3,513,119  5/1970  Cannelongo _____ 260—28.5

DOUGLAS J. DRUMMOND, Primary Examiner

R. A. DAWSON, Assistant Examiner

U.S. Cl. X.R.

156—308; 161—239; 260—45.7 P